J. C. DUNHAM.
AUTOMATIC WAGON BRAKE.
APPLICATION FILED JUNE 19, 1908.
913,272.
Patented Feb. 23, 1909.
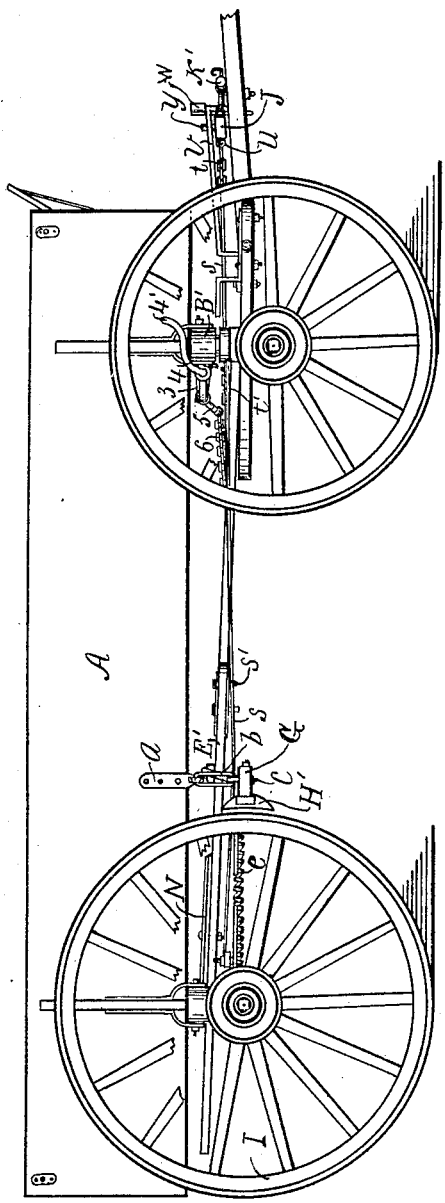
Fig. 1.
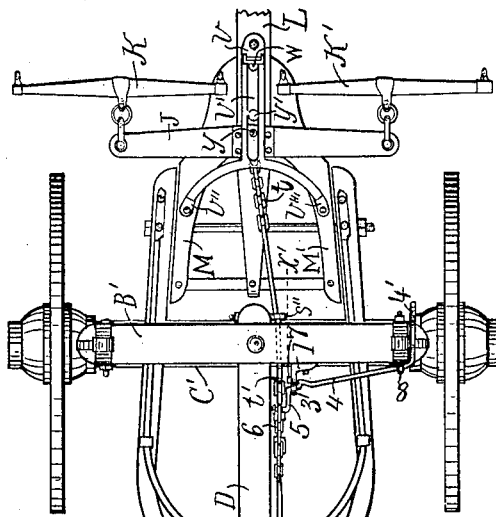
Fig. 2.
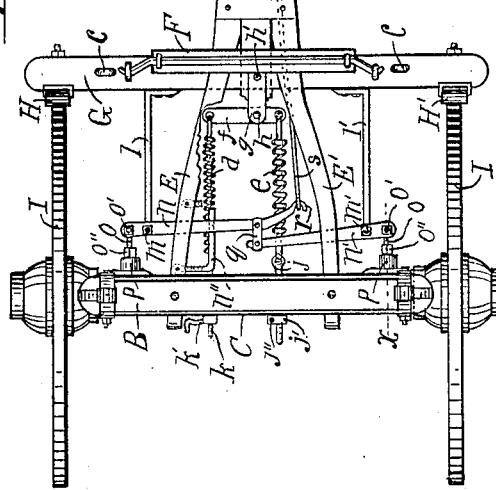
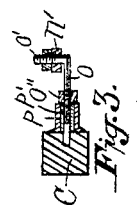
Fig. 3.
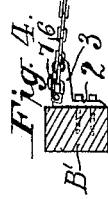
Fig. 4.
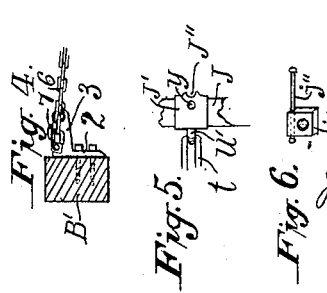
Fig. 5. Fig. 6.
Witnesses:
S. C. Taylor.
Mabel B. Marble.
Inventor.
Joseph C. Dunham.
By A. D. Marble
Attorney.
THE NORRIS PETERS CO., WASHINGTON, D. C.

UNITED STATES PATENT OFFICE.

JOSEPH C. DUNHAM, OF OKLAHOMA, OKLAHOMA.

AUTOMATIC WAGON-BRAKE.

No. 913,272.  Specification of Letters Patent.  Patented Feb. 23, 1909.

Application filed June 19, 1908. Serial No. 439,350.

*To all whom it may concern:*

Be it known that I, JOSEPH C. DUNHAM, a citizen of the United States, residing at Oklahoma city, in the county of Oklahoma and State of Oklahoma, have invented certain new and useful Improvements in Automatic Wagon-Brakes, of which the following is a specification.

My invention relates to automatic wagon brakes, in which a plurality of springs are secured to the rear axle of the wagon and to the brake beam to press the brake-blocks against the periphery of the rear wagon wheels, the pressure of the brake-blocks being adjustable by means of threaded nuts having handles for turning them; by means of a rod attached to the center of the doubletree and to a pair of levers connected with the brake beam the pulling of the team forces the said brake beam forward and disengages the brake-blocks from the wheels; by a bell-crank-lever and chain connected with said rod the brake may be released at any time, all of which will hereinafter be fully explained and pointed out in the claim.

The objects of my invention are; first, to provide a brake which will be automatic in operation relieving the team of the necessity of holding back while going down grades; second, to relieve the driver of attention and operation of the brake; third to provide an automatic brake which may be released at will. I accomplish these objects by the mechanism illustrated in the accompanying drawings forming a part of this specification in which—

Figure 1 is an elevation of an ordinary farm wagon provided with one of my brakes; Fig. 2 is a plan of the same wagon with the box or bed removed; Fig. 3 is a vertical section of one of the duplicate socket-studs on line $x$ Fig. 2; Fig. 4 is a horizontal section on line $x'$ Fig. 2 to show one view of the releasing block; Fig. 5 is a plan view of a portion of the doubletree; Fig. 6 is a perspective of one of the threaded nuts having a handle.

Similar characters refer to similar parts in the several views.

Referring to the drawings, A designates the wagon box and B and B' indicate the rear and front bolsters upon which the wagon box rests, the box being removed in Fig. 2 to avoid obscuring various parts; D indicates the reach, its rear portion being broken away; E and E' indicate the rear hounds, which with the reach supports the brake-support F, when the wagon box is removed, in which case the brake-beam G is entirely dependent upon said support F, but during the service of the wagon box A the said brake-beam depends for its support upon the duplicate brake hanging straps $a$ carrying the links $b$ secured in the eye-bolts $c$ which are secured in the brake-beam G, having secured thereto the brake-blocks H and H'. To provide that the said brake-blocks shall, normally, press against the peripheries of the rear wheels I of the wagon the tension spiral springs $d$ and $e$ are provided, having their front ends secured in the ends of the adjusting lever $f$ which is secured to the central portion of the brake-beam G by the duplicate clevis-straps $g$ and the bolts or rivets $h$ and $h'$ extending through their ends. See Fig. 2. The rear end of said spiral spring $e$ is hooked into an eye-bolt $j$ passing through the rear axle and provided with a threaded nut $j'$ having a sliding bar handle $j''$ for turning the same to regulate the more permanent pressure of the brake, see Figs. 2 and 6. For temporary adjustments the smaller and weaker spiral spring $d$ is secured to the long arm of the adjusting lever $f$, the stem portion $k$ of the spring $d$ extends rearwardly through the rear axle of the wagon, said stem portion being threaded and provided with a handle-nut $k'$ to regulate the tension for light and heavy loads, the greater the weight of the load the greater the tension should be.

To provide the mechanism for the pulling of the team to release or disengage the brake the brake-beam G has secured to the rear edge, intermediate its center and ends, two similar push-rods $l$ and $l'$ each having its rear end turned at a right angle forming a stem as $m$ and $m'$ which are threaded and provided with nuts; the said stems are pivotally secured in the push levers $n$ and $n'$ near their heels or outer ends which are perforated and pivotally secured on the right-angled threaded and nutted stem portion $o'$ of the duplicate lever pivotal rods $o$ having their body portions $o$ threaded and provided with nuts $o''$, the said rods being to support the heavy ends of the said levers and to adjust the same; to support said rods the duplicate socket studs $p$ are provided and are firmly secured to the front portion of the rear axle near its ends, and to prevent the threads on the rods o from wearing, the bushing p' of leather or other suitable material is inserted in the opening of said studs, see Figs. 2 and 3. In front of the rear axle, parallel thereto and midway between said studs the push levers n and n' are pivotally attached, preferably by duplicate clevis-straps q having their ends pivotally riveted through the push levers n and n', one of said levers, preferably n, having its smaller free end bent forward and terminate in a hook r to which the brake releasing rod s is attached, the front end of said rod being attached to one end of a chain t having its opposite end attached to the staple or eye-bolt u of the doubletree J. At the rear of the front axle C' the releasing rod s is cut and a piece of chain t' is inserted to permit longitudinal movement of the said rod, which is held in place and guided by the eye-bolt s' secured in the front portion of the rear hound E' and the eye-bolt s'' passing laterally through the front end of the reach D. That the pulling of the team may release the brake, the doubletree J and the swingletrees K K must have a free forward and backward movement of six or eight inches, to provide for this movement the ordinary hammer-strap is substituted by a metallic guiding plate v having its front or head end bent downward and forward and bolted to the tongue L, its body portion having a longitudinal slot v' and its rear portion terminating in lateral arm members v'' and v''' having their ends bent downward and rearward and bolted to the tongue-hounds M and M'; on a vertical line with said front end of said slot v' a hole is bored through the wagon tongue and the wagon wrench w is inserted in said hole for the front edge of the doubletree J to contact with while the team is pulling the wagon. See Figs. 1, 2 and 5. To maintain the center of the doubletree J over the center of the tongue L the centering stud y is driven part way through the doubletree J midway its ends. To prevent the release or disengagement of the brake a vertical hole y' is bored through the tongue immediately in front of the doubletree when the team is not pulling and the wagon-wrench handle is placed in said hole.

To move the wagon backward by team, or to move it by hand, a novel device is constructed consisting of a releasing block 1 firmly secured to the rear surface of the front bolster B' by means of its body portion 2; from the upper portion of the body of said block an arm 3 projects rearwardly its end having therein a lateral opening in which the bell-crank lever 4 rests and rotates, said lever being supported by the eye-bolt 8 in the bolster B' and having a hand portion 4' and a right-angled releasing arm 5 to which the chain 6 is attached in any convenient manner, in the present case the end of said arm is bent at a right-angle, passed through the end link of said chain and secured by a nut; to lock the brake out of use, the slightly projecting stud 7 near the end of the arm 3 of the releasing block 1 is provided to prevent the chain arm 5 from rotating too far and checking the same when just past the center. See Figs. 1, 2 and 4.

To attach the chain t to the doubletree J an eye-bolt may be secured in the doubletree and project rearwardly, as in the present case, or a doubletree casement J' may be used having a rearward staple u' and a front bolt-seat J'' as shown in Fig. 5.

In operation, the wagon being at rest and the brake set, as the team moves forward from the position shown in Fig. 2 to the one shown in Fig. 1, with the doubletree contacting with the draw-bolt or wagon-wrench w, which by means of the releasing rod s and the levers n and n' and the push rods l and l' force the brake-beam G forward disengaging the brake-blocks H and H' from the wheels I. See Fig. 2. To use the brake to prevent the team from moving when it is desired that they should stand, place the draw-bolt in the hole y' in the tongue in front of the doubletree. To release the brake for moving the wagon backward or by hand grasp the hand portion 4' of the bell-crank-lever 4 and rotate it rearward, which by means of the chain 6 and the rod s the engagement of the brake is released. See Figs. 1, 2 and 4. Normally the brake is in active service and the draft of the team releases it, the tension of the springs operating as a cushion to the team in starting loads. To maintain the push levers n and n' on a plane with their outer ends a U-shaped bar n'' has its ends bolted to the under side of one of the rear hounds and has its body portion contact with the under side of one of the said levers. To protect the push bars, spiral springs etc. the protection board N is secured to the upper portion of the rear hounds immediately in front of the rear bolster, see Fig. 1, it being omitted from Fig. 2 to prevent obscurity.

Having thus described my invention, what I claim as new and desire to secure by Letters Patent is—

In an automatic wagon brake having a brake-beam with brake-blocks; a plurality of spiral springs adjustably secured to the rear axle of the wagon and having their front ends pivotally secured in the outer ends of an adjusting lever f being pivotally attached to the central portion of the said brake-beam to normally press the brake-blocks against the periphery of the rear wheels of the wagon; a pair of push-bars or rods having their feet secured to the rear edge of said brake-beam and having their bodies extend rearward for the purpose of forcing the brake-beam forward; a pair of push-levers in line with the rear axle and in front thereof having their outer ends pivotally secured to pivotal rods $o$ and having their inner ends attached to move in unison, the inner end of one of said levers being bent forward and terminating in a hook $r$, the said levers having the rear ends of the said push-bars pivotally secured in said levers near their outer ends to force the brake-beam forward; a pair of socket-studs secured to the front surface of the rear axle each of said studs having a bushing $p'$ in its opening to support and relieve from wear the pivotal rod $o$ having an adjusting nut abutting against said stud; a U-shaped lever support $n''$ having its ends secured to the under side of one of the rear hounds and having its body portion contact the under side of one of the said push levers to maintain them in line with the axle; a guiding plate over the doubletree and having a head end bent downward and forward and bolted to the tongue, its body portion having a slot therein and having a rearward termination, of two arm members having their feet bolted to the tongue hounds to retain the doubletree in place and permit it to move forward and back; a releasing rod $s$ having one of its ends attached to the said doubletree and its opposite end hooked onto the end of the push lever $n$; to release the brake; a releasing block having a body 2 secured to the rear surface of the front bolster, a rearwardly extending arm 3 with an opening in its end and from the top of said arm intermediate its ends a stud 7 projects toward the reach of the wagon; a bell-crank-lever 4 having the inner end of its body portion resting in said opening and having a lateral arm for attaching the releasing chain thereto, the outer end of said body portion being supported by an eye-bolt secured laterally in the end of the bolster, the outer end of said body portion being bent at a right angle to form a handle to rotate it to release the brake, substantially as described.

In testimony whereof I affix my signature in presence of two witnesses.

JOSEPH C. DUNHAM.

Witnesses:
 EMORY H. DUNHAM,
 C. M. CARLEE.